(12) United States Patent
Dupoiron

(10) Patent No.: US 6,282,933 B1
(45) Date of Patent: Sep. 4, 2001

(54) METHOD OF MANUFACTURING A METAL CARCASS FOR A FLEXIBLE PIPE OR UMBILICAL

(75) Inventor: François Dupoiron, Barentin (FR)

(73) Assignee: Coflexip, Paris (FR)

( * ) Notice: Subject to any disclaimer, the term of this patent is extended or adjusted under 35 U.S.C. 154(b) by 0 days.

(21) Appl. No.: 09/424,019

(22) PCT Filed: Jun. 17, 1999

(86) PCT No.: PCT/FR99/01463

§ 371 Date: Nov. 17, 1999

§ 102(e) Date: Nov. 17, 1999

(87) PCT Pub. No.: WO00/00650

PCT Pub. Date: Jan. 6, 2000

(30) Foreign Application Priority Data

Jun. 30, 1998 (FR) .................................................. 98 08323

(51) Int. Cl.[7] ................................................. B21C 37/12
(52) U.S. Cl. ................................................. 72/49; 72/379.2
(58) Field of Search ................................. 72/49, 50, 379.2

(56) References Cited

U.S. PATENT DOCUMENTS 3,958,439 * 5/1976 Kawaguchi et al. .................... 72/163
4,854,032 * 8/1989 Dambre .................................. 72/378
5,666,841 * 9/1997 Seeger et al. .......................... 72/110

FOREIGN PATENT DOCUMENTS

| 0429357 | 5/1991 | (EP) . |
| 0494299B1 | 6/1994 | (EP) . |
| 2560608 | 9/1985 | (FR) . |
| 1376266 | 12/1974 | (GB) . |
| 9202751 | 2/1992 | (WO) . |
| 9618060 | 6/1996 | (WO) . |

OTHER PUBLICATIONS

BS EN 10088–2 : 1995 "Stainless steels—Part 2. Technical delivery conditions for sheet/plate and strip for general purposes".

* cited by examiner

*Primary Examiner*—Lowell A. Larson
(74) *Attorney, Agent, or Firm*—Ostrolenk, Faber, Gerb & Soffen LLP

(57) ABSTRACT

Method of manufacturing a metal carcass for flexible pipe or umbilical comprising shaping a band of metal strip and then helically winding it to form the metal carcass which, in cardioid mode, has a given collapse strength, wherein the metal strip is work-hardened prior to shaping to give it at least a 15% higher elongation at rupture, and in that the said metal carcass which is made from the said work-hardened metal strip has, in cardioid mode, a collapse strength which is at least 15% higher than the given collapse strength.

6 Claims, No Drawings

METHOD OF MANUFACTURING A METAL CARCASS FOR A FLEXIBLE PIPE OR UMBILICAL

BACKGROUND OF THE INVENTION

The present invention relates to a method of manufacturing a metal carcass for a flexible pipe or umbilical and relates more particularly to the manufacture of a metal strip that can be used to produce a metal carcass.

The flexible pipe to which reference is made in what follows is the pipe used in off-shore oil production and which comprises, from the inside outwards, a metal carcass, an internal sealing sheath, a pressure vault, one or more layers of armour and an external sealing sheath. A flexible pipe of this kind is known to the specialists as a rough-bore flexible pipe as opposed to a so-called smooth-bore flexible pipe wherein the innermost element consists of an internal sealing sheath on which a pressure vault is wound.

These flexible pipes have to exhibit a certain number of mechanical properties particularly collapse strength to allow them to resist collapse which may be brought about by the external pressure, when the flexible pipe is in service, particularly in deep-water applications, and/or the contact pressures exerted on the flexible pipes, particularly during laying and handling. Now, this collapse strength often depends on the mechanical integrity of the metal carcass which, practically alone, has to withstand the force of the external pressure.

The metal carcass is generally made of a profiled strip wound into interlocked turns, for example, an interlocked strip or interlocked shaped wire such as a T-shaped, U-shaped, S-shaped or Z-shaped wire. The shaped strip or wire is wound at an angle in the region of 90°, so that the flexibility of the metal carcass produced is not affected, so as to give the flexible pipe comprising such a metal carcass sufficient flexibility.

This being the case, there are a number of solutions which have been proposed to attempt to improve the collapse strength.

A first solution consists in increasing the thickness of the strip used to produce the metal carcass, but keeping the same S-shaped profile. However, there is an upper limit of the thickness which cannot be exceeded, and of the order of 3 mm. Above this thickness, shaping tools would no longer be able to shape the strip, unless extremely robust tools were made, but this is not economically acceptable. Furthermore, the increase in pipeline weight is not compatible with deep-water applications.

A second solution consists in increasing the height of its carcass while keeping the same profile and the same initial strip thickness. This kind of solution produces a carcass whose weight is equivalent to that of the first solution. This type of carcass is described in EP-0,429,357. Here too, the thickness of the strip which cannot exceed 3 mm proves to be a limiting factor.

A third solution consists in increasing the second moment of area of the profile by simplifying it; to this end, a carcass of the so-called box-section strip has been employed. However, the box-section strip led to an increase in the thickness of the strip and in the volume of the metal carcass and therefore to an increase in the weight of the flexible pipe and in its cost. The box-structure carcass is described in EP-0,494,299.

A fourth solution consists in increasing the yield strength of the strip by using high performance metal alloys such as duplex stainless steels or any other alloy with good mechanical properties (nickel-based alloys). This last solution considerably increases the cost of the metal carcass and therefore of the flexible pipe for certain uses thereof.

A flexible-pipe carcass may deform when a significant load is applied to it, the formation being in two main modes, namely the cardioid mode or the ovalized mode. To prevent ovalization of the carcass from occurring too rapidly, a pressure vault may be used which is dimensioned such that ovalization is delayed for as long as possible. Thus, in practice, and under the conditions of use of the flexible pipe, the metal carcass tends to deform only in cardioid mode.

To improve the performance (collapse strength) of the metal carcass in cardioid mode, it is necessary to improve the mechanical properties of the materials used for the carcass. However, when the mechanical properties of the strip from which the metal carcass is made are improved in a controlled manner, this sometimes results in a strip which can no longer be shaped to a determined profile because it has an insufficient elongation at rupture (A%).

SUMMARY OF THE INVENTION

The object of the present invention is to provide a method of manufacturing a metal carcass so that it has an improved collapse strength without an increase in weight, and for this to be possible irrespective of the metal used to make the strip.

In other words, for the same weight of metal carcass, better collapse strength is achieved. It is possible for this improvement in the mechanical properties to be put to good use in various ways, at the choice of the manufacturer of flexible pipes and/or according to the conditions of use of the flexible pipes.

One subject of the present invention is a method of manufacturing a metal carcass that can be used in a flexible le pipe comprising a pressure vault, in which use is made of a band of metal strip which is shaped and then helically wound to form the said metal carcass which, in cardioid mode, has a given collapse strength, characterized in that the said metal strip is work-hardened prior to shaping to give it elongation at rupture of at least 15%, and in that the said metal carcass which is made from the said work-hardened metal strip has, in cardioid mode, a collapse strength which is at least 15% higher than the said given collapse strength.

One advantage of the present invention lies in the fact that the weight of the metal carcass can be reduced without in any way lowering the collapse strength.

This is because, with a given collapse strength of the metal carcass obtained according to the invention, it is possible to use a flexible pipe either at a greater depth for the same weight of carcass or at a shallower depth but with a lighter carcass. It is generally accepted that the depth at which a flexible pipe can be used depends, in particular, on the collapse strength in cardioid mode of the metal carcass contained within the flexible pipe.

Other advantages and features will emerge clearly from reading the description of a preferred embodiment of the invention.

DESCRIPTION OF A PREFERRED EMBODIMENT

Work-hardening a metal or alloy under forces higher than its yield strength allows it to be converted into some other body with a higher yield strength but with a smaller plastic domain. This is why the metals usually work-hardened are reserved for determined applications such as, for example, applications in rail transport, in the manufacture of cables or of springs. The loss of plasticity or the reduced ability of such metals to be shaped did not prevent any major drawbacks or, by contrast, were sought after in these applications.

Hitherto, it has not in any way been envisaged for a previously work-hardened strip to be used to produce a metal carcass for a flexible pipe for the essential reason that it was known that the work-hardened strip could lose its ability to be shaped, which was prohibitive in the production of the metal carcass. Furthermore, it was known that the strip would, after work-hardening, be more fragile. These main reasons therefore led the manufacturers of flexible pipes to reject any form of work-hardening of the strip in order to be sure of being able to shape it into the various configurations mentioned hereinabove, and of being able to wind it onto reels, particularly with a view to storage.

Contrary to received wisdom, it was found, according to the invention, that it had become possible to work-harden a metal strip to give it improved mechanical properties while at the same time maintaining its ability to be shaped. The type of work-hardening selected had to meet two main criteria:

The first criterion was that the strip, after work-hardening, had to have an elongation at rupture, known by metallurgists and/or flexible-pipe specialists by the factor A%, at least equal to 15 and preferably higher than 20, irrespective of the elongation at rupture value that the strip had prior to work-hardening.

The second criterion was that the collapse strength of the metal carcass in cardioid mode should be at least 15% higher than that of a carcass made with a metal strip that is not work-hardened or that is insufficiently work-hardened.

Taking, for example, a strip manufactured from a metal referenced 301 or 304 L in the AISI standard, and measuring the yield strength ($R_p$ 0.2 in MPa) and the elongation at rupture (A%), values of 310 MPa and 46, respectively, are found. When a strip of this kind is shaped into an S-shape, for example, local work-hardening occurs, generally at the changes of curvature during shaping, the work-hardening being sometimes in compression (concave regions) and sometimes in extension or tension (convex regions). It then follows that the yield strength is raised at the changes of curvature so as to give the shaped strip a mean $R_p$ of the order of 540 MPa, the elongation at rupture increasing from 46% to 52%. The collapse strength of the carcass made with this strip is of the order of 122 bar.

If the strip made with the same grade of metal or with an equivalent grade such as 301 LN is work-hardened using the so-called skin-passed mode, which causes surface work-hardening, that is to say work-hardening of just the surface part of the strip, the yield strength is raised because it changes from 424 MPa to 466 MPa, while at the same time having an elongation at rupture of 38%. The metal carcass obtained from this pre-work-hardened (skin-passed) strip has a mean yield strength of 630 MPa with an elongation at rupture of 53%. However, such pre-work-hardening does not improve the collapse strength of the flexible pipe in cardioid mode, which is always about 122 to 125 bar in the case of a flexible pipe with an inside diameter of 21 cm (8 inches).

By contrast, when the grade 301 LN strip is work-hardened not by the skin-passed standard but in accordance with standard C850, a yield strength $R_p$ 0.2 of 552 MPa is obtained, as opposed to the 424 MPa before work-hardening, and an elongation at rupture of 38% is obtained, the metal carcass obtained with this strip which has been work-hardened in accordance with standard C850 having a mean $R_p$ 0.2 of 600 MPa and an elongation at rupture of 31%. The collapse strength in cardioid mode is 149 bar for a flexible pipe with an inside diameter of 21 cm (8 inches).

Comparing these last results with those obtained without work-hardening it may be seen that the yield strength of the strip is increased by 41.5%, the elongation at rupture of the strip is lowered by 7% but that in spite of this lowering, the ability to be shaped is maintained, and the collapse strength of the carcass in cardioid mode is equal to 149 bar, namely is increased by more than 22%.

This comparison shows that for a flexible pipe structure comprising a pressure vault and for the same carcass weight of 14.84 kg/m (diameter of about 20 cm or 8 inches, strip dimensions 41×1 in mm), the mechanical properties of the metal carcass are markedly improved. The improvement achieved is put to good use either so that the flexible pipe incorporating the metal carcass can be used at greater depths because, by virtue of the present invention, the metal carcass is able to withstand a greater external pressure force, or to lighten the metal carcass by almost 25% by weight by reducing the thickness of the strip (0.8 mm instead of 1 mm, the weight being brought down from 14.84 kg/m to 11.11 kg/m).

Better mechanical properties are achieved when the work-hardening of the basic metal strip is adjusted to a higher value but one which still complies with the standard C850 ($R_p$ 0.2=650 MPa).

The values of the various parameters mentioned earlier and relating to the strip are:

| | |
|---|---|
| yield strength prior to shaping: | 660 MPa |
| elongation at rupture A %: | 34 |
| mean yield strength of carcass after shaping: | 725 MPa |
| elongation at rupture of the carcass A %: | 20 |
| carcass collapse strength: | 176 bar |
| carcass weight: | 14.84 kg/m |

It may be seen that for the same carcass weight, the collapse strength has increased from 122 bar, using a strip which is not work-hardened, to 176 bar, using a strip which is work-hardened to $R_p$ 0.2=650 MPa, namely is increased by more than 44%.

To obtain a collapse strength of the order of 122 bar, it is possible to use a grade 304 L strip, for example measuring 40×0.8 mm, which would be work-hardened in accordance with standard C850 to obtain an 8-inch (≈20 cm) diameter carcass the weight of which would be 11.11 kg/m, namely a weight reduction of 25% and a collapse strength of 135 bar.

In the tables below:
Table I relates to the various grades of metal tested and to the measured properties of the strip and of the metal carcass, state 2B corresponding to a state without work-hardening, and state CW1 (cold work 1), CW2 and CW3 corresponding to various states of work-hardening corresponding to the denominations C850 and C1000 in standard En 10088-2;
Table II represents the change in collapse strength in bar under an external pressure and in the weight of the metal carcass as a function of the properties of the strip used for a flexible pipe comprising a pressure vault.

Table 1 shows that all the materials used to make a strip which have an elongation at rupture (A%) higher than 20 in the states without work-hardening and with work-hardening can be shaped and therefore made into a metal carcass. Only grade 316 L, when work-hardened in accordance with standard C1000, is not suitable because its elongation at rupture (A%) is lower than 15%. It can be seen that duplex and superduplex do not need to be work-hardened, something which was already known because they are used for the manufacture of metal carcasses. However, as the major drawback of these materials is their cost, they are reserved for highly specific flexible-pipe applications.

The table shows the savings that can be obtained using the method according to the invention.

The second column shows that all the materials that have been work-hardened in accordance with standard C850 and which have a yield strength approximately equal to 550 MPa would produce a certain collapse strength in cardioid mode, the said strength depending on the geometric characteristics of the strip and of the carcass used. Thus, in the case of a strip measuring 100×2.5 m and a carcass diameter of 23.75 cm (9 and a half inches), the collapse strength increases from 271 bar, in state 2B, to 331 bar after work-hardening in accordance with standard C850 and for an $R_p$ 0.2 of 550 MPa.

The third column refers to work-hardening in accordance with the standard C850 and to a yield strength at $R_p$ 0.2 of 650 MPa.

It is easy to see the savings that can be made in passing from the state 2B (not work-hardened) to the states which have been work-hardened in accordance with standard C850.

The carcasses made with a duplex or superduplex have a collapse strength in the state 2B which can vary between 176 and 349 bar because their yield strength $R_p$ is close to 650 MPa (634 and 650 MPa, respectively), according to the dimensions of the strip and of the carcass which are shown in Table 2. However, it is found that instead of using these very expensive materials, it is possible to use materials which are less precious and therefore less expensive by work-hardening them in accordance with standard C850, such as, for example, 301, 301 LN, 304L or even 316 L. For very deep water where it is necessary to have very high collapse strengths, the use of a duplex or superduplex alloy work-hardened prior to the shaping of the strip may be envisaged, so as to give the carcass a greater collapse strength so long as the elongation at rupture of the work-hardened strip is at least equal to 15%.

In any event, the present invention allows lightening by more than 10% when the strip is work-hardened in accordance with standard C850, this lightening being all the greater, the larger the dimensions of the strip.

In practice, all the metals which, after work-hardening, have a yield strength higher than 500 MPa and an elongation at rupture of at least 15%, and preferably higher than 20%, can be used to manufacture a metal carcass. More specifically, use is made of stainless steels of the unstable austenitic type including, for example, the grades 301, 301 LN, 304, 304 L, etc, or stainless steels of the stable austenitic type including, for example, the grades 316 L, 316 LN, 304 LN and more highly alloyed and austeno-ferritic grades which, after work-hardening, retain the ability to be shaped. Although the method according to the invention can be employed with practically all metals and/or their alloys, the most advantageous effects have been obtained with austenitic and austeno-ferritic metals.

As can be seen in Table 2, the grades used exhibit, after work-hardening, a collapse strength in cardioid mode of between 114 and 376 bar, it being understood that these limits can vary according to the geometry of the strip. However, it is suggested that strengths below 100 or 110 bar should not be used, it being possible for the upper limit to exceed 400 bar.

Likewise, the recommended yield strength $R_p$ 0.2 is to be between 500 and 1000 MPa, but it is possible to vary these limits so long as the twofold criterion of elongation at rupture (A%) and collapse strength is met.

Although the present invention has been described in the case of a strip for a flexible pipe, it is understood that the said work-hardened strip can be used for producing a carcass that can be used in an umbilical.

TABLE I

| Grade | state (work-hardening) state | state (standard) | Properties in the strip state $R_p$ 0.2 | A % | Properties in the shaped state $R_p$ 0.2 | A % (profile) |
|---|---|---|---|---|---|---|
| 301–304L | 2B | 2B | 310 | 46 | 539 | 52 |
| 316L | 2B | 2B | 330 | 40 | 550 | |
| 301LN | 2B | 2B | 424 | 47 | 619 | 50 |
| 301LN sk | skin pass | 2B | 466 | 38 | 630 | 53 |
| 301LN | CW1 | C850 | 552 | 38 | 600 | 30–35 |
| 301 | CW1 | C850 | 557 | 37 | 584 | 31 |
| 301 | CW2 | C850+ | 660 | 34 | 725 | 20 |
| 316L | CW2 | C850+ | 678 | 23 | 730 | 10 |
| 316L | CW3 | C1000 | 895 | 10 | 950 | 5 |
| DUPLEX | 2B | 2B | 634 | 27 | 720 | 17 |
| 301 | CW3 | C1000 | 877 | 22 | 930 | 10 |
| super-duplex | 2B | 2B | 650 | 30 | 850 | 19 |

TABLE II

| Nuance state $R_p$ 0.2 | 304L 2B 300 | 301L/301LN C850 550 | 304L/301LN C850+ 650 |
|---|---|---|---|
| Diameter 8" strip 48 × 1 carcass weight 14.84 kg/m | 122 | 149 | 176 |
| Diameter 8" strip 40 × 0.8 carcass weight 11.11 kg/m namely 25% lighter | | 114 | 135 |
| Diameter 9.5" strip 100 × 2.5 carcass weight 50.21 kg/m | 271 | 331 | 392 |
| Diameter 9.5" strip 100 × 2.5 carcass weight 35.39 kg/m namely 29% lighter | | 240 | 284 |
| Diameter 9.5" strip 100 × 2.3 carcass weight 44.27 kg/m | 242 | 295 | 349 |

What is claimed is:

1. A method of manufacturing a metal carcass for use in a flexible pipe or umbilical, which pipe or umbilical includes a pressure vault outward of the carcass, the method comprising:

shaping a metal strip and then helically winding the strip to form a metal carcass, wherein the metal strip would have a given strength, if the metal strip were in a cardioid mode while inside the pressure vault and without work-hardening of the strip;

the method further comprising work-hardening the metal strip, prior to shaping the strip and prior to winding the strip to form a carcass, for giving the strip elongation at rupture of at least 15% and such that the metal carcass formed by helically winding the work-hardened metal strip has in cardioid mode and while inside the pressure vault a collapse strength which is at least 15% higher than the given collapse strength.

2. Method according to claim 1, wherein the metal used to form the strip and the work-hardening thereof are selected so that the elongation at rupture of the work-hardened metal strip is higher than 20%.

3. Method according to claim 2, wherein the metals used for the strip have, after work-hardening, a yield strength higher than 500 MPa and an elongation at rupture higher than 20%.

4. Method according to claim 3, wherein the yield strength of the material, after work-hardening, is between 500 and 1000 MPa.

5. Method according to claim 1, wherein the metal of the metal strip is selected from the group consisting of stainless steels of the unstable or stable austenitic type and austeno-ferritic stainless steels which, after work-hardening, retain the ability to be shaped.

6. Method according to claim 1, wherein the metal used to form the strip and the work-hardening are selected so that the collapse strength, in cardioid mode, of the carcass is between 110 and 400 bar.

* * * * *